June 23, 1942. H. C. JOHNSTON 2,287,178
METHOD OF FORMING REFRIGERATING APPARATUS
Filed Oct. 22, 1938

INVENTOR.
Hal C. Johnston
BY Spencer, Hardman & Fehr
ATTORNEYS.

Patented June 23, 1942

2,287,178

UNITED STATES PATENT OFFICE 2,287,178

METHOD OF FORMING REFRIGERATING APPARATUS

Hal C. Johnston, Dayton, Ohio, assignor to General Motors Corporation, Dayton, Ohio, a corporation of Delaware Application October 22, 1938, Serial No. 236,482

1 Claim. (Cl. 113—118)

This invention relates to refrigeration and more particularly to heat exchange elements, grille elements and the like and the method of making said elements.

An object of this invention is to provide an improved element in which the bonding material is evenly distributed to all of the bonded joints.

Still another object of this invention is to provide an improved method for distributing the bonding material to the joints to be bonded during the bonding operation.

Further objects and advantages of the present invention will be apparent from the following description, reference being had to the accompanying drawing, wherein a preferred form of the present invention is clearly shown.

In the drawing:

Fig. 1 of the drawing diagrammatically represents a hydrogen brazing furnace;

In the construction of heat exchange units, grilles and the like, it has been customary to make the units out of copper-plated steel sheets. In brazing the copper-plated steel sheets, the copper plating assisted in evenly distributing the brazing material. When plain steel was used, however, the molten brazing material did not evenly distribute itself throughout the full length of the heat exchange tubes. I have found that it is possible to eliminate the copper plating on the steel sheets when employing my improved method.

Figure 1:
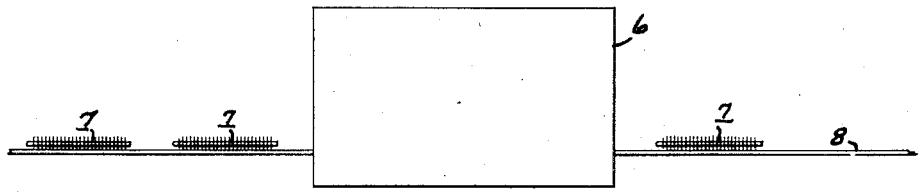
Figure 2:
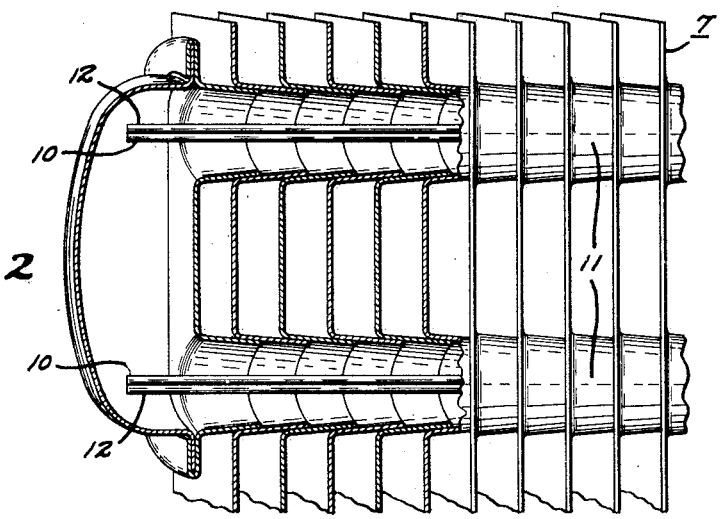
Fig. 2 is a fragmentary view partly in section showing the arrangement of the bonding material within the element prior to placing the element within the furnace.
Figures 3, 4:
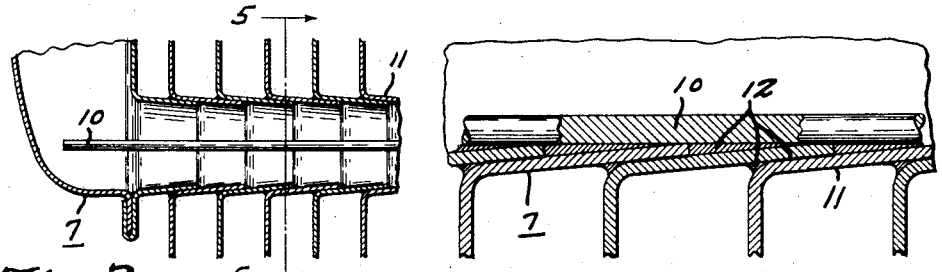
Fig. 3 is a fragmentary sectional view showing a portion of the interior of the same element after the bonding operation.
Fig. 4 is a fragmentary view with parts broken away and on an enlarged scale showing the distribution of the bonding material after the bonding operation has been completed.
Figure 5:
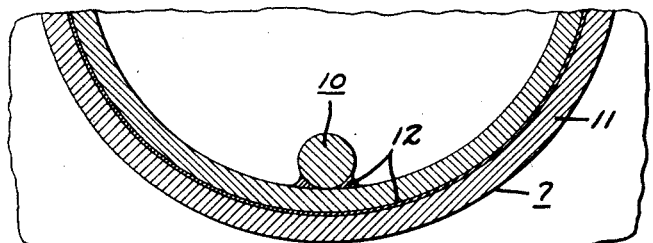
Fig. 5 is an enlarged sectional view taken on line 5—5 of Fig. 3 showing the distribution of the bonding material.

Referring now to Fig. 1 the numeral 6 designates a furnace through which the heat exchange elements or the like 7 are carried by means of an endless belt 8. The heat exchange elements are of the general type shown in the Karmazin Patent No. 2,119,134. Each heat exchange element is made up from a series of uncoated steel sheets provided with tapered tubular projections which are telescoped together to form continuous tubes in the manner more fully explained in the above mentioned patent. In order to bond the seams of the heat exchange element, bonding material 12, which for purposes of illustration has been shown in wire form, is placed into each tube along side of a steel wire 10. By placing a steel wire such as wire 10 along the bottom of each tube section 11 of the element, the bonding material 12, when in the molten state, tends to evenly distribute itself along the wire 10 to all of the seams throughout the entire length of each tube. The steel wire 10 is preferably arranged to lie on the bottom surface of the tube during the bonding operation. The crevice between the wire 10 and the tube section 11 tends to attract the molten brazing material and consequently serves to distribute the brazing material throughout the full length of the tube even though the steel plates used in making the heat exchange element have no copper coating.

The wire 10 not only serves to distribute the bonding material but also serves to reinforce the unit. By virtue of the fact that the steel wire 10 has a bonded connection with each tube section each joint is reinforced. A weak joint in one tube section, therefore, does not place an added strain on adjacent joints in adjacent tubes.

While the form of embodiment of the invention as herein disclosed, constitutes a preferred form, it is to be understood that other forms might be adopted, all coming within the scope of the claim which follows.

What is claimed is as follows:

The method of manufacturing tubing which comprises telescoping a plurality of tubular elements together so as to form a tube, placing bonding material along the length of said tube, placing a relatively small distributing strip of a material having a higher melting point than the melting point of the bonding material along one wall of said tube, heating the assembly to a temperature sufficient to melt said bonding material but not sufficient to melt said distributing strip, whereby said strip serves to distribute evenly the molten bonding material along the length of said tube.

HAL C. JOHNSTON.